US011197323B2

(12) United States Patent
Reial et al.

(10) Patent No.: US 11,197,323 B2
(45) Date of Patent: Dec. 7, 2021

(54) RANDOM ACCESS PREAMBLE TRANSMISSION USING BEAMFORMING

(71) Applicant: Telefonaktiebolaget LM Ericsson (publ), Stockholm (SE)

(72) Inventors: Andres Reial, Malmö (SE); Magnus Åström, Lund (SE); Henrik Sahlin, Mölnlycke (SE)

(73) Assignee: Telefonaktiebolaget LM Ericsson (Publ)

(*) Notice: Subject to any disclaimer, the term of this patent is extended or adjusted under 35 U.S.C. 154(b) by 708 days.

(21) Appl. No.: 16/070,876

(22) PCT Filed: Jun. 13, 2018

(86) PCT No.: PCT/EP2018/065658
§ 371 (c)(1),
(2) Date: Jul. 18, 2018

(87) PCT Pub. No.: WO2019/001967
PCT Pub. Date: Jan. 3, 2019

(65) Prior Publication Data
US 2021/0212123 A1     Jul. 8, 2021

Related U.S. Application Data

(60) Provisional application No. 62/524,793, filed on Jun. 26, 2017.

(51) Int. Cl.
*H04W 72/08* (2009.01)
*H04W 74/08* (2009.01)
*H04B 7/06* (2006.01)

(52) U.S. Cl.
CPC ...... *H04W 74/0833* (2013.01); *H04B 7/0617* (2013.01); *H04W 72/08* (2013.01)

(58) Field of Classification Search
CPC .................................................. H04L 12/28
(Continued)

(56) References Cited

U.S. PATENT DOCUMENTS

2020/0036430 A1*   1/2020   Kim ............... H04W 24/10

FOREIGN PATENT DOCUMENTS

| CN | 104023344 A    | 9/2014 |
|----|----------------|--------|
| WO | 2016141961 A1  | 9/2016 |

OTHER PUBLICATIONS

International Search Report, dated Sep. 19, 2018, issued in corresponding PCT Application No. PCT/EP2018/065658, consisting of 5-pages.

(Continued)

*Primary Examiner* — Dang T Ton
(74) *Attorney, Agent, or Firm* — Christopher & Weisberg, P.A.

(57) ABSTRACT

A method, system and wireless device for random access preamble transmission using beamforming are provided. A wireless device includes processing circuitry including a processor and a memory. The processing circuitry is configured to receive a synchronization signal block, SSB, determine a first beam configuration for reception based on at least part of the received SSB, estimate a reciprocity quality for the first beam configuration in a downlink and an uplink, determine a first random access channel, RACH, preamble transmission configuration based on the estimated reciprocity quality, and transmit a first random access, RA, preamble using the first RACH preamble transmission configuration.

26 Claims, 10 Drawing Sheets

(58) Field of Classification Search
USPC .......................................................... 370/329
See application file for complete search history.

(56) References Cited

OTHER PUBLICATIONS

Qualcomm Incorporated: "Reciprocity vs Non-reciprocity in Initial Access/RACH", 3GPP Draft; R1-1612037, 3RD Generation Partnership Project (3GPP), Mobile Compeience Centre; 650, Route Des Lucioles; F-06921 Sophia—Antipolis Cedex; France, vol. RAN WG1, No. Reno, Nevada, USA; 20161114-20161118 ;Nov. 13, 2016 (Nov. 13, 2016).
Ericsson: "4-step random access procedure" 3GPP Draft; R1-1711383 4-Step Random Access Process, 3RD Generation Partnership Project (3GPP), Mobile Competence Centre; 650, Route Des Lucioles; F-06921 Sophia—Antipolis Cedex; France, vol. RAN WG1, No. Qingdao, China; 20170627-20170630; Jun. 17, 2017 (Jun. 17, 2017).
Interdigital Communications: "Random access aspects for beam-based NR initial access", 3GPP Draft; R1-1610320, 3RD Generation Partnership Project (3GPP), Mobile Competence Centre; 650, Route Des Lucioles; F-06921 Sophia—Antipolis Cedex; France, vol. RAN WG1, No. Lisbon, Portugal; 20161010-20161014; Oct. 9, 2016 (Oct. 9, 2016).
Henrik Sahlin et al. "Random Access Preamble Format for Systems with Many Antennas;" Globecom 2014 Workshop—Emerging Technologies for 5G Wireless Cellular Networks; Dec. 8-12, 2014, consisting of 6-pages.
EPO Communication dated Jul. 13, 2021 for Patent Application No. 18731087.5, consisting of 4-pages.

\* cited by examiner

RANDOM ACCESS PREAMBLE TRANSMISSION USING BEAMFORMING

CROSS-REFERENCE TO RELATED APPLICATIONS

This application is a Submission Under 35 U.S.C. § 371 for U.S. National Stage Patent Application of International Application Number: PCT/EP2018/065658, filed Jun. 13, 2018 entitled "RANDOM ACCESS PREAMBLE TRANSMISSION USING BEAMFORMING," which claims priority to U.S. Provisional Application No. 62/524,793, filed Jun. 26, 2017, entitled "RANDOM ACCESS PREAMBLE TRANSMISSION USING FLEXIBLE BEAMFORMING," the entireties of both of which are incorporated herein by reference.

TECHNICAL FIELD

This disclosure relates to wireless communications, and in particular to a method and wireless device for random access preamble transmission using beamforming.

BACKGROUND

Initial Access

In order to connect to a network, a wireless device (WD) acquires network synchronization and obtains system information (SI). Synchronization signals are used to adjust the frequency of the wireless device relative to the network, and to find the proper timing of the received signal from the network. In Third Generation Partnership Project (3GPP) New Radio (NR), the synchronization and access procedure may involve several signals such as the signals described below.

A primary synchronization signal (PSS) allows for network detection in the presence of a high initial frequency error, up to tens of parts per million (ppm). Additionally, the PSS provides a network timing reference. The 3GPP has selected three m-sequences as PSS signals in NR. Since the use of one out of three sequences is known but the channel is unknown, the PSS is typically detected by correlation between the received signal and all of the three possible m-sequences. A correlation value above a threshold typically indicates the existence of a PSS. In order to handle initially large frequency offsets arising from an uncalibrated local oscillator (LO), multiple correlations may be needed to hypothesize over multiple, different frequency errors to cover the range of frequency errors that result from a crystal's open loop frequency inaccuracy.

A secondary synchronization signal (SSS) allows for more accurate frequency adjustments and channel estimation while at the same time providing fundamental network information, e.g., cell ID. Also, m-sequence use and detection is similar to that of the PSS.

The physical broadcast channel (PBCH) provides a subset of the minimum system information for random access. The PBCH will also provide timing information within a cell, e.g., to separate timing between beams transmitted from a cell. The amount of information that can fit into the PBCH is limited in order to keep the size and power allocation low. Furthermore, demodulation reference signals (DMRS) are injected in the PBCH in order to allow for proper reception.

Synchronization Signal (SS) Block and SS Burst

A synchronization signal block (SSB) as proposed for NR includes the above described signals, namely, PSS, SSS and PBCH. The SSB in 3GPP NR also includes a demodulation reference signal (DMRS), since the DMRS sequence selection carries part of the beam index and half-frame information.

In New Radio (NR), specified by 3GPP the physical broadcast channel transmission scheme may have the following proposed composition/structure as illustrated in FIG. 1. In some implementations, the NR-PBCH may also occupy the frequency areas to either side of the NR-PSS. As shown in the diagram of FIG. 1, NR includes a NR-PSS, NR-SS and NR-PBCH in an SS block. Two orthogonal frequency division multiplex (OFDM) symbols are reserved for NR-PBCH transmission. NR-PSS and NR-SSS are defined to be 127 subcarriers wide, whereas the NR-PBCH is defined to be 288 subcarriers wide.

FIG. 2 shows a time line in the x-axis and is a diagram of an SS burst transmission where a number of (typically close in time) SS blocks (SSBs) constitute an SS burst. A collection of SS bursts is an SS burst set. The SS burst set is repeated periodically, e.g., every 20 ms. An SS burst set is transmitted periodically, and the wireless device can, by using the SS blocks in the SS burst set, determine the downlink timing and acquire system information from the PBCH.

A NR wireless device in idle mode can expect an SS burst set transmitted once per 20 ms. In connected mode, the wireless device can be configured to expect SS burst sets once per 5 ms. Hence, once the wireless device has obtained downlink synchronization, the wireless device knows in which slots to expect SS block transmissions. Referring to FIG. 2, there are SSBs, SS bursts including one or more SSBs, and an SSB burst set comprising one or more SS bursts. Each SSB is drawn in various hatched or patterned boxes in FIG. 2. Each different type of hatching/pattern may represent a different beam direction in which the SSBs are transmitted. Conventional repetition of omni-directional transmissions is also supported. Each SSB with a corresponding beam direction is then repeated with, e.g., 20 ms periodicity. The non-filled boxes represent gaps. A gap in the beginning of a slot may be used for the physical downlink control channel (PDCCH), and a gap at the end of a slot may be used for data or an Ultra-Reliable and Low Latency Communication (URLLC) uplink acknowledgement. The longer gap between SS bursts may be used for other transmissions in either the uplink or downlink.

Random Access Procedure

A random access (RA) procedure is used for initial system access, WD transition from idle to active mode and handovers. RA is part of an efficient cellular network design.

A proposed design for the NR 4-step random access procedure is illustrated in FIG. 3 which shows a diagram of uplink and downlink synchronization. Here, two synchronization signal (SS) blocks are transmitted from separate network nodes (network node A, or gNB A and network node B, or gNB B), and received with a relative timing difference.

The wireless device selects a downlink (DL), i.e., from network node to wireless device, timing reference based on the best-quality received SS block, e.g. from network node A, gNB A, and transmits a New Radio random access channel (NR-RACH) preamble based on this DL timing. Both network node A (gNB A) and network node B (gNB B) might detect the RACH such that gNBs might then transmit a random access response (RAR) or the nodes might be coordinated such that only one of them transmit a RAR. Coordination of the nodes is discussed in 3GPP NR Technical Standard Release 15.

The WD may select a downlink timing reference based on a received SS block from the gNB A and may transmit a PRACH preamble based on this downlink timing. Due to propagation delay, the PRACH preamble is received with a timing offset relative to an SS block of the gNB B, which estimates this timing offset and prepares a RAR containing a timing advance (TA) command. This RAR is constructed by a reference signal (RS) and one or several OFDM symbols with data (DS). When the WD receives the RAR, it adjusts its uplink timing based upon the TA command before sending a PUSCH on the uplink. It can also adjust its downlink timing from DL timing estimated by using the RS included in the RAR The random access procedure for 3GPP NR reuses principles of 3GPP Long Term Evolution (LTE) design. However, since a wider range of deployment scenarios and increased requirements on lean design are expected, some changes to the LTE procedures are warranted. In particular, random access channel (RACH) transmission principles may need refinement. As used herein, Msg2 will be referred to as a random access response (RAR) message and Msg1 will be referred to the RACH preamble.

Beamforming

Existing cellular systems use advanced antenna systems. The antenna configurations for transmitting signals from network nodes are typically regularly-spaced, uniform linear or planar arrays where each array position may accommodate a single antenna element or two cross-polarized elements, e.g., in +/−45 degrees configuration. With such antenna arrays, signals may be transmitted in narrow beams to increase signal strength in some directions, and/or to reduce interference in other directions. A well-known transmission/transmitter (TX) beamforming approach for arrays is to apply Discrete Fourier Transform (DFT) preceding over the elements which generates beams with useful beam width on the order of 100/N degrees in a certain dimension if the array has N elements in that dimension and the element separation is half the wavelength For dedicated signal transmission, the most appropriate DFT beam direction may be identified and used for signal transmission to the wireless device. However, to provide broadcast signal coverage over a large area, a single narrow DFT beam is not sufficient. Instead, the beams may be swept, e.g., in time and space to cover the entire region. In practical implementations, N . . . 2N beams per dimension may need to be swept, repeating the broadcast information content in all directions.

DFT beamforming is optimal in the sense that it maximizes output power in the beam direction. This is because all elements may operate at maximum output power and the beam direction is controlled by shifting the phase an equal amount between subsequent antenna elements, thereby allowing for constructive combining in the beam direction. A drawback to beamforming is that, at least if only orthogonal beams are transmitted (i.e., N beam directions from an array with N elements), the gain over the coverage area may vary significantly with high gain drops (straddling loss) in between beam directions, especially for two-dimensional (2D) beam steering.

Expansion of Subarrays

It is desirable to achieve coverage (according to some parameter, e.g., reference signal received power (RSRP)) with as few beams as possible for a given antenna configuration. By minimizing the number of beams, overhead is also minimized, implying an increased system performance. Several algorithms to design beams exist and are well known in the art, e.g., Fast Fourier Transform (FFT) beams, based on filter theory or windowing, or the construction of arbitrarily wide beams by, e.g., Golay sequences. FIGS. 4A and 4B are radiation pattern diagrams of beams with different widths versus azimuth angle in a one-dimensional (1D) antenna array case: antenna selection (FIG. 4A) and port expansion (FIG. 4B) including the impact of available power in an active array. In FIGS. 4A and 4B, examples of a set of beams with narrower and far reaching beams are presented. A solution is antenna selection (FIG. 4A), that is, muting subsets of the available sub-elements. This design approach yields wider beams at the cost of significantly lower output power and coverage. Another solution (FIG. 4B) involves an expansion of a subarray into the full array. For simplicity, this solution is shown here for subarray sizes of 1, 2, 4, 8, . . . , but the same expansion technique can be applied to other subarray sizes as well. Furthermore, the expansion in the example below is a factor of 2, but other factor exists, for example 3 and 5, and it is also possible to combine different factors iteratively. To ease understanding, the technique is shown using the following iterative procedure:

Determine a required or desired beamwidth: For an array with N subelements determine the desired number of subelements M that yields an FFT beam with a required beam width for good coverage (picked from the set $M \in \{2^t\}|_{t=1}^{log_2 N}$), where t is an index (and does not denote time in this context);

Perform array expansion: for $t=log_2 M, \ldots, log_2 N-1$, compute beamforming weights w for the given pair of orthogonal polarizations (A,B) according to $$w_A^{(t+1)} = \begin{bmatrix} w_A^{(t)} \\ -\bar{w}_B^{(t)*} \end{bmatrix}, w_B^{(t+1)} = \begin{bmatrix} w_B^{(t)} \\ \bar{w}_A^{(t)*} \end{bmatrix},$$

where $\bar{w}^*$ denotes complex conjugate and reversing the order of the elements of the vector.

The resulting radiation pattern of the full N-sub-element array will mimic the FFT beam of a subarray with M sub-elements (generated by pre-selected FFT weights $w_A^{(log_2 M)}$ and $w_B^{(log_2 M)}$), however with a better coverage as illustrated when comparing FIG. 4A and FIG. 4B. This procedure can also be generalized to 2D planar arrays in which case the impact of not using all power amplifiers (PAs) in an active array would be even more severe.

In the below description, it is assumed that a set of beams exist in which each beam is characterized by a certain shape (e.g., a maximum beam length and width). The shape should be interpreted as an area fulfilling the coverage metric for the beam. The set of different beams thus constitute different beam shapes, e.g., widths and lengths that may be formed by the antenna elements. Each beam in the set may be easily modified to point in a different direction by adding a phase component between adjacent antenna elements.

The other solution described above maintains the optimality criterion of discrete Fourier transform (DFT) beamforming in that each expansion is only a conjugated and reversed copy of another subset. However, the expansion yields a positive combining of antenna element outputs such that the total output power is doubled for each iteration of the expansion in the example above.

In more general terms, the power gain over antenna element selection for an array of size (M×N) is $$10 \log_{10}\left(\frac{mn}{MN}\right)$$

where m and n are the number of elements used per dimension in case of element selection.

Antenna-Based Subcarrier Decomposition

Another way of designing a wider beam is to partition the signal in the frequency domain. Starting with the Fast Fourier transform (FFT) beam shape using M antenna elements, of N total antenna elements, the SS block subcarriers may be partitioned into N/M sets such that each set is transmitted on separate M antenna elements. By transmitting fewer subcarriers, each subcarrier may be amplified accordingly, by approximately a factor N/M, thereby resulting in a higher total output power.

FIG. 5 is a block diagram of an antenna based subcarrier decomposition. Here, W is a discrimination or precoding matrix with elements of ones and zeros, mapping the subcarriers to respective antenna(s), and where the index i represents the $i^{th}$ antenna element, and the operation carried out is an elementwise multiplication. W is chosen to be sparse such that only a subset of the K total subcarriers in the vector X are mapped to the single, $i^{th}$, antenna. This could be done by selecting every $(N/M)^{th}$ element of X to antenna element i, or by grouping adjacent subcarriers [1, . . . , K M/N]. Other approaches are also possible. Due to the decreased number of subcarriers transmitted on each antenna, it is possible to amplify the signal on each antenna element by N/M. It is also possible to combine W with a beamforming precoding matrix, in which case the element content will change.

SUMMARY

Some embodiments advantageously provide a method and wireless device for random access preamble transmission using beamforming.

In one or more embodiments, the disclosure provides a RACH preamble transmission method at the wireless device that, in one aspect, estimates the extent of available beam reciprocity, determines the appropriate RACH preamble beam configuration based on the extent of reciprocity and/or the best received SSB reception direction, and transmits the preamble.

Additionally, in another embodiment if the initial preamble transmission is unsuccessful, the wireless device may modify the transmission beam configuration (e.g., the beam width and/or direction) and retransmit, potentially multiple times or until successful. The uplink (UL) beam directions may be selected based on the estimated SSB reception directions in the downlink (DL) and utilizing available beam correspondence information.

The disclosure includes one or more specific embodiments as described herein. In one example, the wireless device estimates insufficient reciprocity and starts transmitting the RACH preamble using a wide-beam (e.g., near-isotropic or cell-wide) beam pattern. If the RA procedure fails, e.g., the wireless device does not receive a RAR within a predetermined reception time window, the wireless device repeats RACH preamble transmission using one or more directed beams that provide a beamforming gain.

At one extreme, the wide beam is created using power-maximizing transmission techniques like expansion of subarrays or antenna-based subcarrier decomposition. At the other extreme, the directed beam may be, e.g., a beam out of a set of a grid of beams if the wireless device has an array, a hybrid beam, or a flexibly precoded beam based on DL channel measurements from SSB.

Thus, according to one aspect, in some embodiments, a wireless device includes processing circuitry including a processor and a memory. The processing circuitry is configured to: receive a synchronization signal block (SSB) and determine a first beam configuration for reception based on at least a part of the received SSB. The processing circuitry is further configured to estimate a reciprocity quality for the first beam configuration in a downlink and an uplink. The processing circuitry is further configured to determine a first random access channel (RACH) preamble transmission configuration based on the estimated reciprocity quality, and transmit a first random access (RA) preamble using the first RACH preamble transmission configuration.

According to this aspect, in some embodiments, the SSB includes a primary synchronization signal (PSS), a secondary synchronization signal (SSS) and a broadcast channel (PBCH). In some embodiments, the reciprocity quality is a measure of an extent to which at least one beam parameter estimated in a receiver of the wireless device deviates from a corresponding beam parameter of a corresponding beam transmitted by a network node to the wireless device, wherein the greater the deviation, the lower the reciprocity quality. In some embodiments, a beam parameter of the at least one beam parameter is one of a beam direction and beam width and a measure of deviation is a difference in one of a direction and a width between a beam of the first beam configuration and the corresponding beam transmitted by the network node. In some embodiments, when the reciprocity quality is above a predefined threshold, the first RACH preamble transmission configuration is a narrow beam configuration. In some embodiments, when the reciprocity quality is below a predefined threshold, the first RACH preamble transmission configuration is a wide beam configuration.

In some embodiments, the reciprocity quality depends at least in part on at least one of wireless device movement and wireless device rotation. In some embodiments, the processing circuitry is further configured to: responsive to an RA response (RAR) being not received: modify the first RACH preamble transmission configuration to a second RACH preamble transmission configuration different from the first RACH preamble transmission configuration; and transmit second RA preamble using the second RACH preamble transmission configuration. In some embodiments, in case of a communication failure using the first beam, the first RA preamble is retransmitted using a second beam. In some embodiments, the first beam is a narrow beam and the second beam is a wide beam. In some embodiments, the processing circuitry is configured to generate a wide beam using a subarray expansion technique. In some embodiments, the processing circuitry is configured to generate a wide beam using antenna-based subcarrier decomposition. In some embodiments, the processing circuitry is configured to generate a narrow beam using fast Fourier transform (FFT) beam construction. In some embodiments, the processing circuitry is configured to generate a narrow beam using matched filter precoding.

According to another aspect, in some embodiments, a method for a wireless device includes receiving a synchronization signal block (SSB) and determining a first beam configuration for reception based on at least a part of the received SSB. The method further includes estimating a reciprocity quality for the first beam configuration in a downlink and an uplink. The method further includes determining a first RACH preamble transmission configuration based on the estimated reciprocity quality, and transmitting a first RA preamble using the first RACH preamble transmission configuration.

According to this aspect, in some embodiments, the SSB includes a PSS, a SSS and a PBCH. In some embodiments, the reciprocity quality is a measure of an extent to which at least one beam parameter estimated in a receiver of the wireless device deviates from a corresponding beam parameter of a corresponding beam transmitted by a network node to the wireless device, wherein the greater the deviation, the lower the reciprocity quality. In some embodiments, a beam parameter of the at least one beam parameter is one of a beam direction and a beam width and a measure of deviation is a difference in one of a direction and a width between a beam of the first beam configuration and the corresponding beam transmitted by the network node. In some embodiments, when the reciprocity quality is above a predefined threshold, the first RACH preamble transmission configuration is a narrow beam configuration. In some embodiments, when the reciprocity quality if below a predefined threshold, the first RACH preamble transmission configuration is a wide beam configuration. In some embodiments, reciprocity quality depends at least in part on at least one of wireless device movement and wireless device rotation. In some embodiments, the method further includes: responsive to an RAR not being received: modifying the first RACH preamble transmission configuration to a second RACH preamble transmission configuration different from the first RACH preamble transmission configuration, and transmitting the second RA preamble using the second RACH preamble transmission configuration. In some embodiments, in case of a communication failure using the first beam, the method further includes retransmitting the first RA preamble using a second beam. In some embodiments, the first beam is a narrow beam and the second beam is a wide beam. In some embodiments, the method further includes generating a wide beam using a subarray expansion technique. In some embodiments, the method further includes generating a wide beam using antenna-based subcarrier decomposition. In some embodiments, the method further includes generating a narrow beam using FFT beam construction. In some embodiments, the narrow beam is generated using matched filter precoding.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
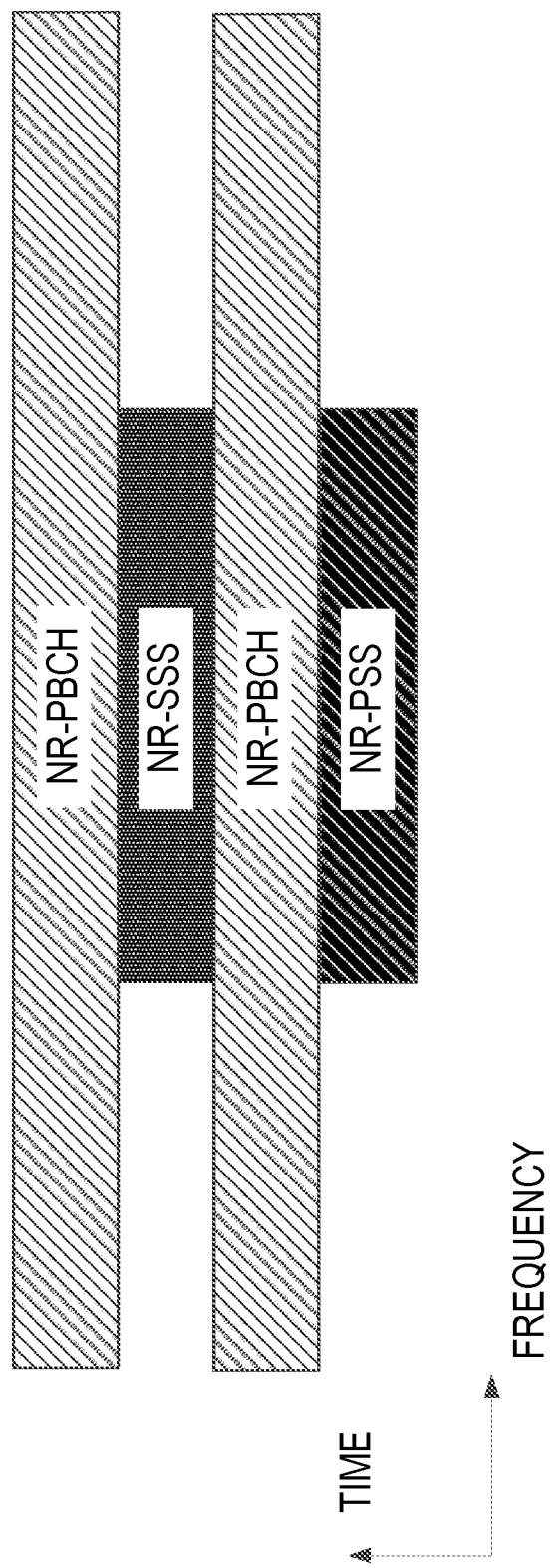
FIG. 1 that is a schematic diagram of NR-PSS, NR-SS and NR-PBCH in an SS block.
Figure 2:
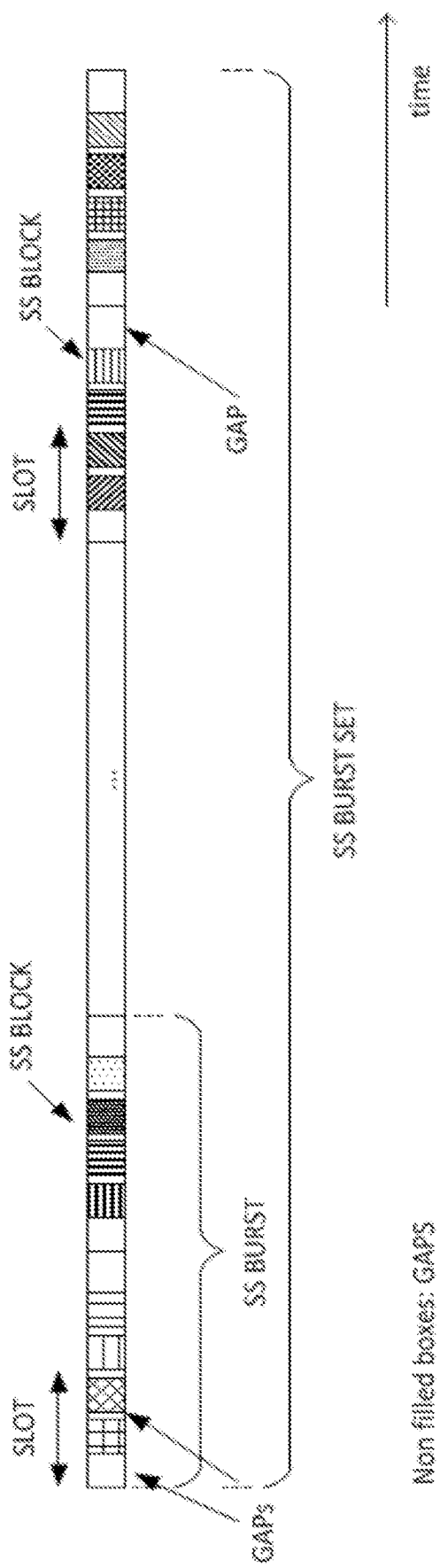
FIG. 2 is a schematic diagram of an SS burst transmission where a number of (typically close in time) SS blocks (SSBs) constitute an SS burst.
Figure 3:
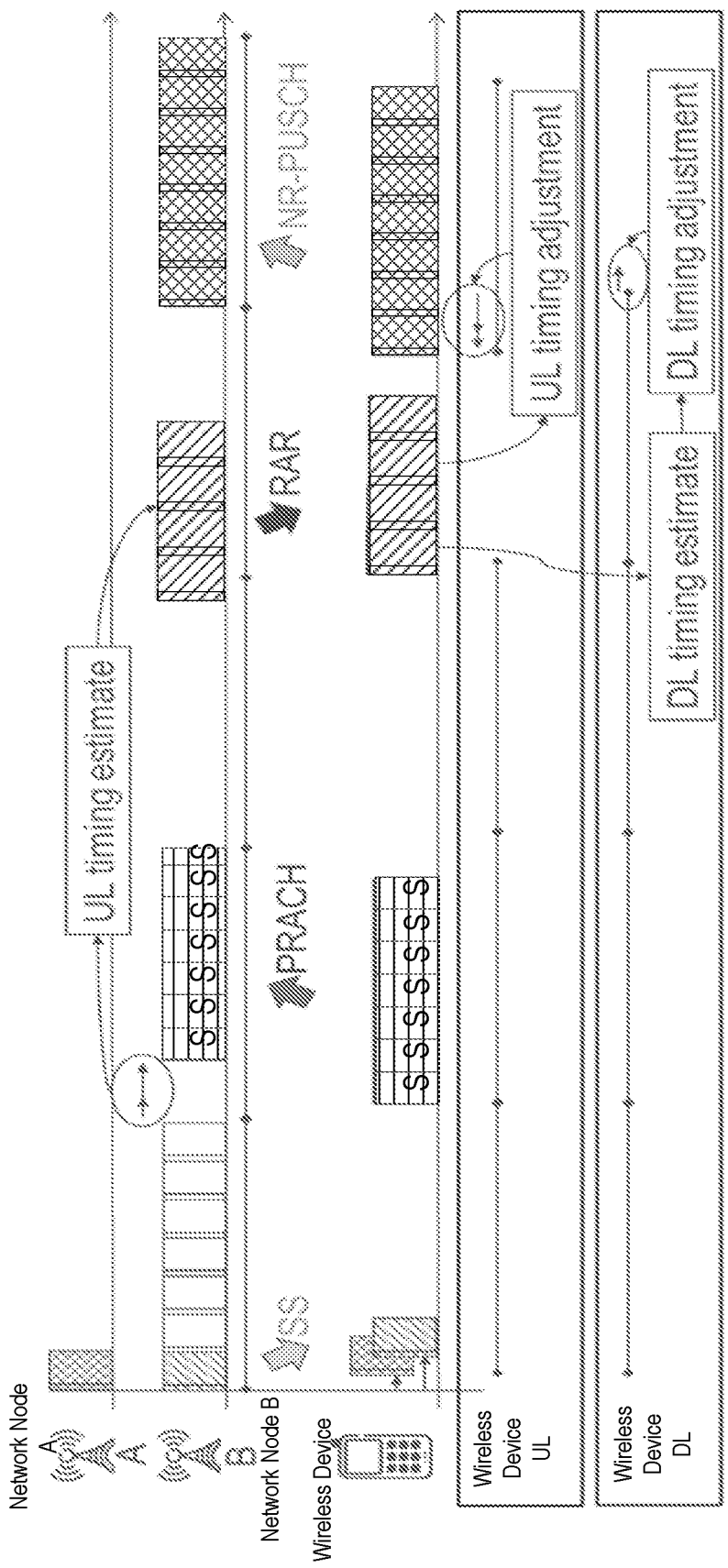
FIG. 3 that is a schematic diagram of uplink and downlink synchronization.
Figure 4B:
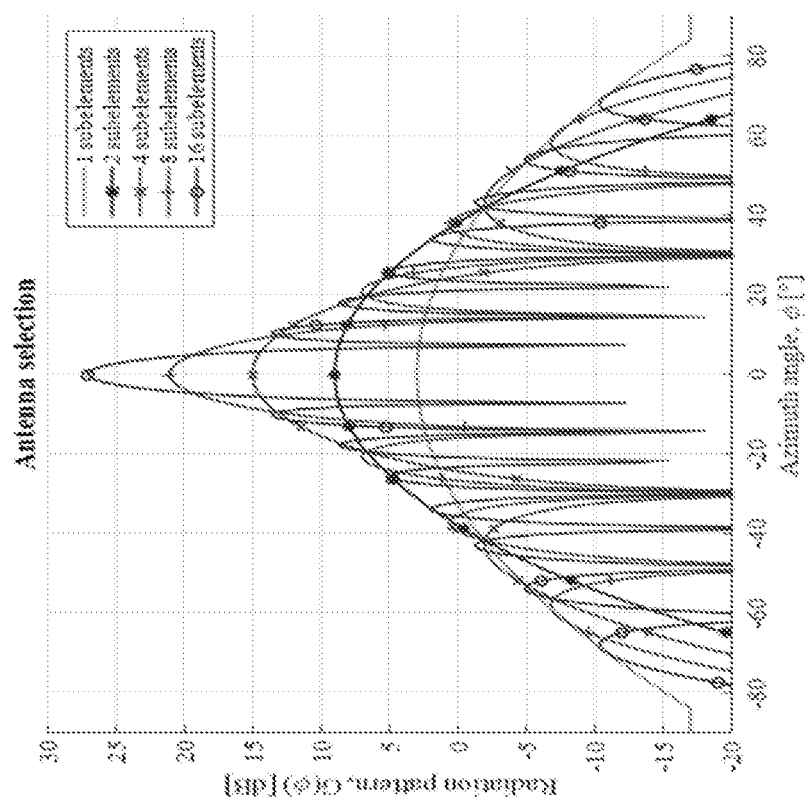
FIGS. 4A and 4B are diagrams of beams with different widths in a 1D array case: antenna selection (FIG. 4A) and port expansion (FIG. 4B) including impact of available power in an active array.
Figure 4A:
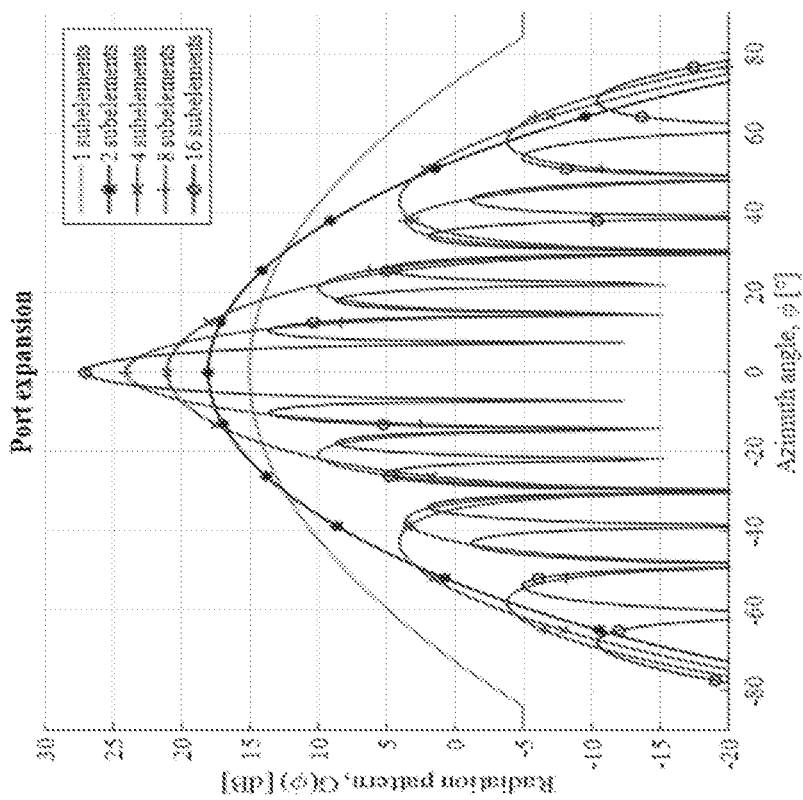
Figure 5:
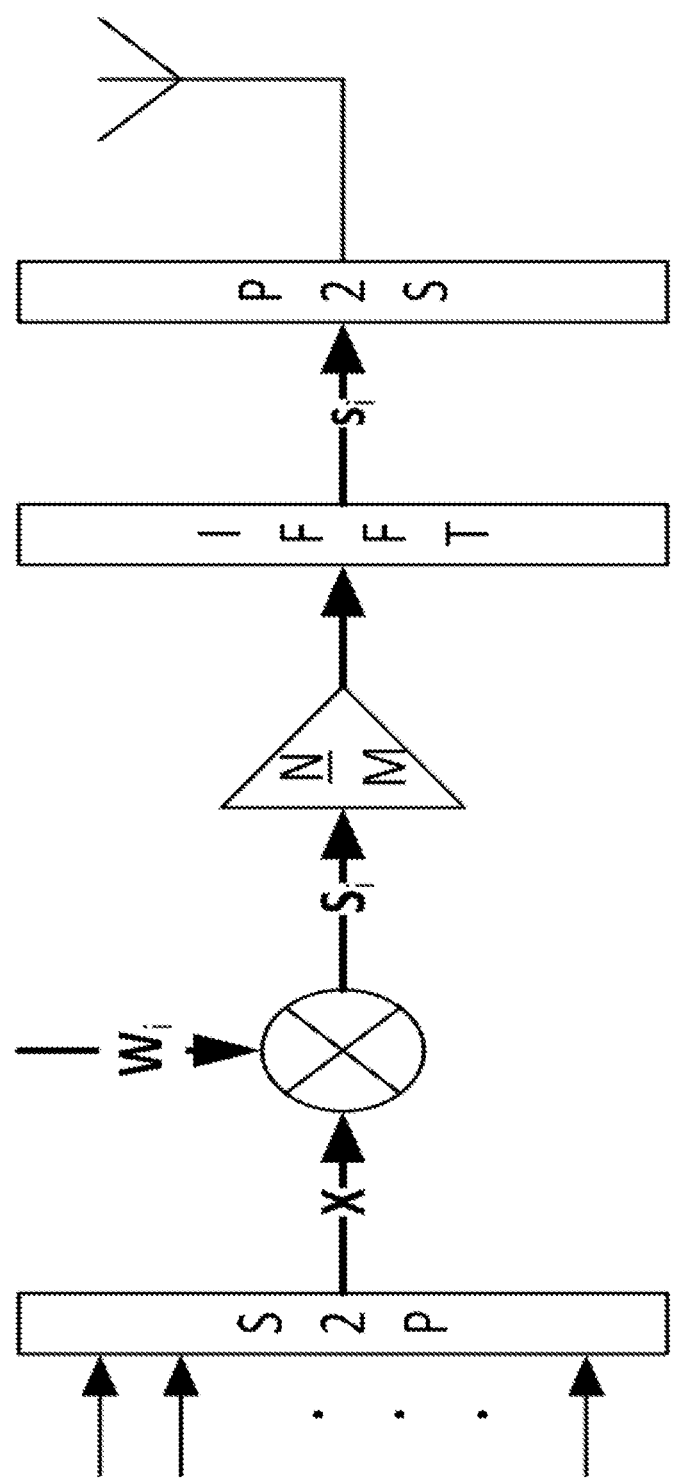
FIG. 5 is a block diagram of an antenna based subcarrier decomposition.

In the LTE RA procedure, the wireless device generally transmits the random access channel (RACH) preamble (or Msg1 in 3GPP) without a spatial directional preference, only following the timing reference and RACH preamble window indicated by the PSS/SSS and master information block (MIB) information. In NR, many wireless device classes employ antenna arrays consisting of numerous elements that have considerable directivity and beamforming capabilities, especially in higher (millimeter wave) bands.

Such wireless devices can be viewed to have options for RACH preamble transmission, two of which are described herein. In one type of solution, a wireless device attempts to transmit an isotropic (non-directional) preamble signal. Depending on the choice of how the isotropic (or in general, wide) beam is created, the total transmitted uplink (UL), i.e., from wireless device to network node, power and/or the power radiated in the direction of the transmission-reception point (TRP) associated with the SSB may be limited. If the wireless device is near the edge of the TRP coverage area, the preamble signal may not be reliably received by the network node.

In another type of solution, the wireless device may transmit a directed beam with the preamble signal towards the presumed direction of the TRP. However, the direction estimate based on the received SSB or the DL/UL beam correspondence information may not be entirely accurate, whereby the wireless device may repeat the RACH preamble transmission using multiple candidate beam directions. This delays the completion of the RA procedure and creates strong interference in other directions in the process.

There is thus a need for a RACH preamble transmission approach that avoids the drawbacks of power limitations and access delay associated with state of the art approaches.

In some embodiments described below, at least some of the problems with existing systems are solved. In one or more embodiments, the disclosure increases the RA coverage area using only wide-beam transmission, and shortens the RA time delay relying on a sweeping RACH preamble in narrow beams. This results in a more responsive network (NW) access for the wireless devices, reduced NW capacity impact due to RACH preamble interference, and in general more efficient NW operation.

As used herein, a narrow beam has a width that is on the order of 100/N. degrees or less, and a wide beam has a width that is on the order of greater than 100/N, where N is the number of antenna elements in a dimension of the antenna array of the network node or WD. Other definitions may be adopted. For example, the criteria that narrow beam width has a width that is on the order of 50/N or 200/N may be adopted. The smaller the numerator, X, of the ratio X/N, the narrower the narrow beam. The narrower the narrow beam, the greater the directivity of the narrow beam.

Before describing in detail exemplary embodiments, it is noted that the embodiments reside primarily in combinations of components and processing steps related to methods, network nodes and wireless devices. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

The term signal used herein can be any physical signal or physical channel. Examples of physical signals are reference signal such as PSS, SSS, CRS, PRS etc. The term physical channel (e.g., in the context of channel reception) used herein is also called as 'channel. Examples of physical channels are MIB, PBCH, NPBCH, PDCCH, PDSCH, sPUCCH, sPDSCH. sPUCCH. sPUSCH, MPDCCH, NPDCCH, NPDSCH, E-PDCCH, PUSCH, PUCCH, NPUSCH, etc. These terms/abbreviations may be used according to 3GPP standard language, in particular according to LTE and/or NR.

It may be considered for cellular communication there is provided at least one uplink (UL) connection and/or channel and/or carrier and at least one downlink (DL) connection and/or channel and/or carrier, e.g., via and/or defining a cell, which may be provided by a network node, in particular a base station or eNodeB or gNB. An uplink direction may refer to a data transfer direction from a terminal to a network node, e.g., base station and/or relay station. A downlink direction may refer to a data transfer direction from a network node, e.g., base station and/or relay node, to a terminal. UL and DL may be associated to different frequency resources, e.g., carriers and/or spectral bands. A cell may comprise at least one uplink carrier and at least one downlink carrier, which may have different frequency bands. A network node, e.g., a base station or eNodeB or gNB, may be adapted to provide and/or define and/or control one or more cells.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal such as a wireless device may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

Data or information may refer to any kind of data, in particular any one of and/or any combination of control data or user data or payload data. Control information (which may also be referred to as control data) may refer to data controlling and/or scheduling and/or pertaining to the process of data transmission and/or the network or terminal operation.

Figure 6:
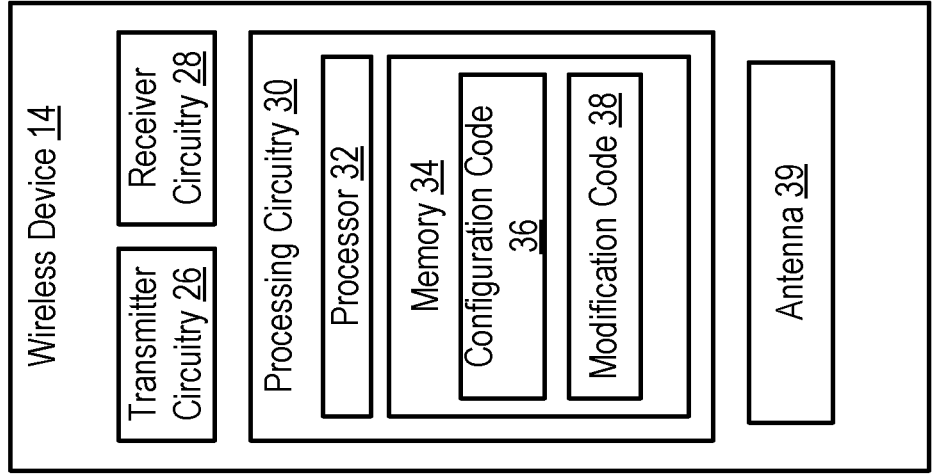
FIG. 6 is a block diagram of an example system with a network node and a wireless device for random access preamble transmission using beamforming in accordance with the principles of the disclosure.
Figure 6:
Figure 6:
Figure 6:
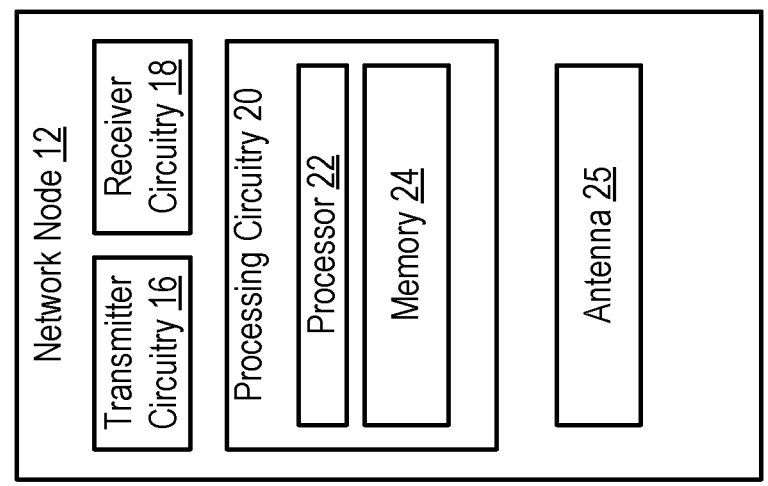

Referring now to drawing figures in which like reference designators refer to like elements there is shown in FIG. 6 is a block diagram of an example system for random access preamble transmission using beamforming in accordance with the principles of the disclosure, where the system is generally referred to as system "10." System 10 includes one or more network nodes 12 and one or more wireless devices 14, in communication with each other via one or more communication networks, paths and/or links using one or more communication protocols, as described herein.

Network node 12 includes transmitter circuitry 16 and receiver circuitry 18 for communicating with wireless device 14, other nodes 12 and/or other entities in system 10. In one or more embodiments, transceiver circuitry 16 and/or receiver circuitry 18 include and/or is/are replaced by one or more communication interfaces. Network node 12 includes processing circuitry 20. The term "network node", such as "network node 12" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, gNodeB (gNB), multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS), etc.

Processing circuitry 20 includes processor 22 and memory 24. In addition to a traditional processor and memory, processing circuitry 20 may comprise integrated circuitry for processing and/or control, e.g., one or more processors and/or processor cores and/or FPGAs (Field Programmable Gate Array) and/or ASICs (Application Specific Integrated Circuitry). Processor 22 may be configured to access (e.g., write to and/or reading from) memory 24, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by processor 22 and/or other data, e.g., data pertaining to communication, e.g., configuration and/or address data of nodes, etc.

Processing circuitry 20 may be configured to control any of the methods and/or processes described herein and/or to cause such methods, signaling of SSB and/or processes to be performed, e.g., by network node 12. Processor 22 corresponds to one or more processors 22 for performing network node 12 functions described herein. Network node 12 includes memory 24 that is configured to store data, programmatic software code and/or other information described herein. In one or more embodiments, memory 24 is configured to store configuration code. The network node further includes an antenna 25 that includes at least one antenna element.

Wireless device 14 includes transmitter circuitry 26 and receiver circuitry 28 for communicating with network node 12, other wireless devices 14 and/or other entities in system 10. In one or more embodiments, transmitter circuitry 26 and/or receiver circuitry 28 include and/or is/are replaced by one or more communication interfaces. Wireless device 14 also includes processing circuitry 30.

Processing circuitry 30 includes processor 32 and memory 34. In addition to a traditional processor and memory, processing circuitry 30 may include integrated circuitry for processing and/or control, e.g., one or more processors and/or processor cores and/or FPGAs (Field Programmable Gate Array) and/or ASICs (Application Specific Integrated Circuitry). Processor 32 may be configured to access (e.g., write to and/or reading from) memory 34, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 34 may be configured to store code executable by processor 32 and/or other data, e.g., data pertaining to communication, e.g., configuration and/or address data of nodes, etc.

Processing circuitry 30 may be configured to control any of the methods and/or processes described herein and/or to cause such methods, signaling and/or processes to be performed, e.g., by wireless device 14. Processor 32 corresponds to one or more processors 32 for performing wireless device 14 functions described herein. Wireless device 14 includes memory 34 that is configured to store data, programmatic software code and/or other information described herein. In one or more embodiments, memory 34 is configured to store configuration code 36. For example, configuration code 36 includes instructions that, when executed by processor 32, causes processor 32 to perform the functions described herein such as the functions described with respect to FIGS. 8-9. In one or more embodiments, memory 34 is configured to store modification code 38. For example, modification code 38 includes instructions that, when executed by processor 32, causes processor 32 to perform the functions described herein such as the functions described with respect to FIG. 10. The wireless device 14 further includes an antenna 39 which includes a plurality of antenna elements.

Figure 7:
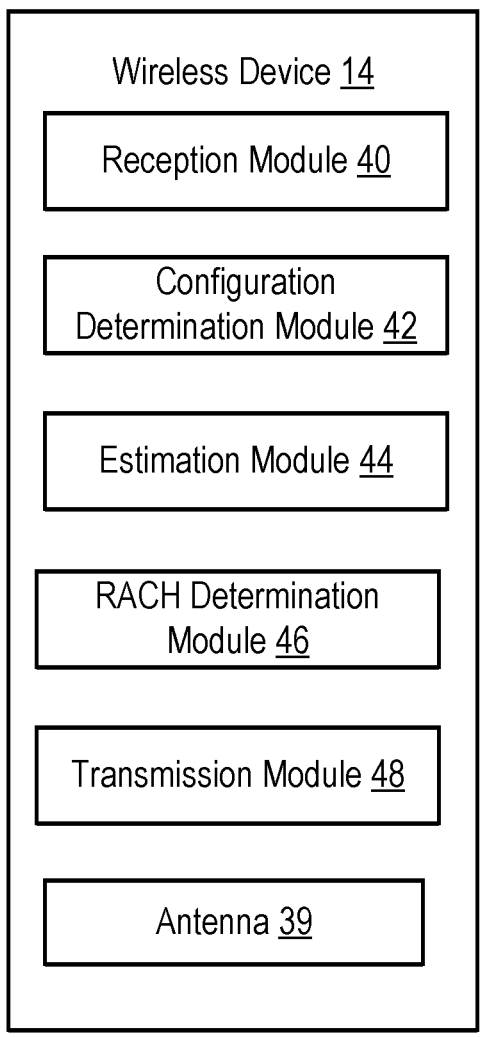
FIG. 7 is another example block diagram of wireless device in accordance with the principles of the disclosure.

FIG. 7 is another example embodiment of wireless device 14 in accordance with the principles of the disclosure. Wireless device 14 includes reception module 40 which is configured to receive a synchronization signal block (SSB) as described herein. Wireless device 14 includes configuration determination module 42 which is configured to determine a beam configuration for reception based on the received SSB, as described herein. Wireless device 14 includes estimation module 44 which is configured to estimate a reciprocity quality for the beam configuration in the downlink and the uplink. Wireless device 14 includes RACH determination module 46 which is configured to determine a RACH preamble transmission configuration based on the estimated reciprocity. Wireless device 14 includes transmission module 48 which is configured to transmit a random access, RA, preamble using the determined RACH preamble transmission configuration. The wireless device 14 further includes an antenna 39 which includes a plurality of antenna elements.

The term wireless device such as "wireless device 14" as used herein may be a radio communication device, wireless device endpoint, mobile endpoint, device endpoint, sensor device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Although embodiments are described herein with reference to certain functions being performed by network node 12 and/or wireless device 14, it is understood that the functions can be performed in other network nodes and elements. It is also understood that the functions of the network node 12 and/or wireless device 14 can be distributed across the network cloud, such as the Internet or access network backhaul network, so that other nodes can perform one or more functions or even parts of functions described herein.

Figure 8:
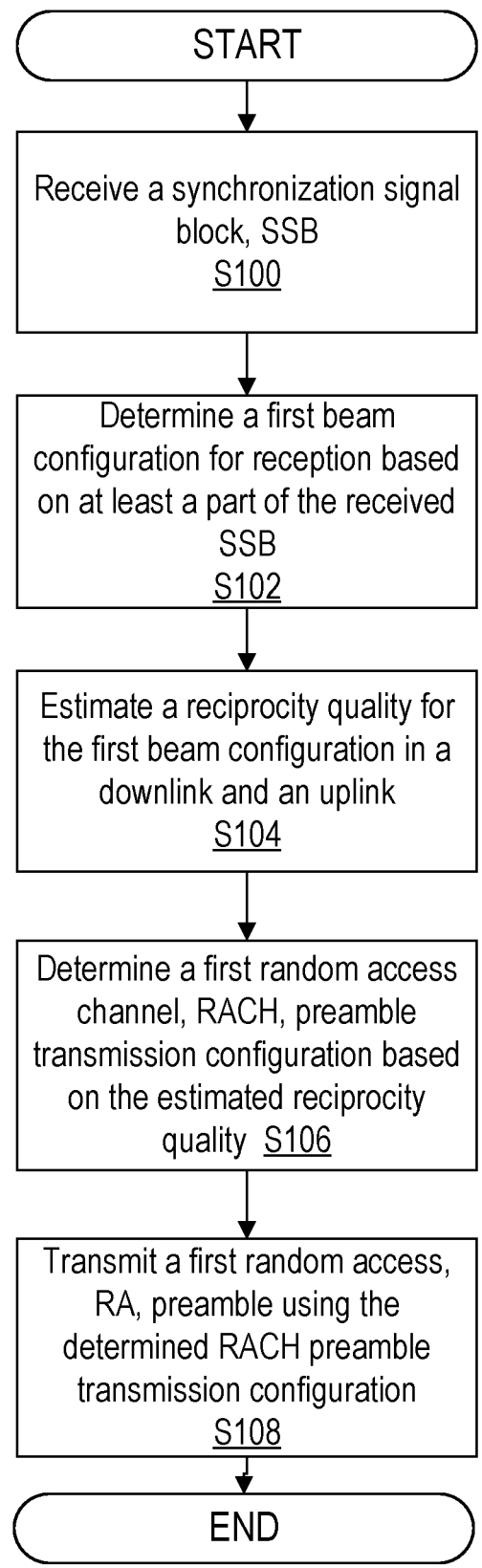
FIG. 8 is a flow diagram of the configuration process of configuration code in accordance with the principles of the disclosure.

FIG. 8 is a flow diagram of an example configuration process of configuration code 36 in accordance with the principles of the disclosure. Processing circuitry 30 is configured to receive, via the receiver circuitry 28, a synchronization signal block (SSB), as described herein (Block S100). Processing circuitry 30 is configured to determine a first beam configuration for reception based on at least a part of the received SSB, as described herein (Block S102). For example, beam configuration may be specified by beam parameters such as beam width, beam direction and/or precoding weights. Processing circuitry 30 is also configured to estimate a reciprocity quality for the beam configuration in the downlink and the uplink, as described herein (Block S104). In one or more embodiments, reciprocity quality characterizes, or is a measure of the extent to which beam parameters (e.g., direction, width, etc.) estimated or applied in the receiver apply to beams transmitted with the same intended parameters in the transmitter side. Stated alternatively, reciprocity quality may be expressed as an extent to which at least one beam parameter estimated in a receiver of the wireless device deviates from a corresponding beam parameter of a corresponding beam transmitted by a network node to the wireless device, wherein the greater the deviation, the lower the reciprocity quality.

In one example, the reciprocity quality may be expressed in terms of an error in the direction angle or expected loss in link signal-to-noise ratio (SNR) when a mismatched beam is transmitted. The reciprocity quality may depend on hardware design of the receiver (RX) and transmitter (TX) chains, in the operating mode (e.g. allowed power consumption of the device) but, in the case of wireless devices 14, also on linear movement or rotation of wireless device 14. The resulting angular error or SNR degradation may for different movement patterns and speeds be evaluated experimentally and tabulated ahead of time. The tabulated results may then be used to determine a quality metric as a function of the estimated movement, operating mode, or other characteristic of the wireless device 14.

Processing circuitry 30 is configured to determine a first random access channel (RACH) preamble transmission configuration based on the estimated reciprocity quality (Block S106). RACH preamble transmission configuration may, in addition to the conventional parameters of preamble sequence and time/frequency allocation, herein also include the beam or spatial transmission or precoding parameters, e.g., active antenna elements, target beam width and direction, applied precoding weights, etc. The beam or spatial parameters may be determined to, e.g., tentatively match the corresponding receiver-side parameters that were used to receive the SSB, or channel characterization based on the SSB. Processing circuitry 30 is configured to transmit a first random access (RA) preamble using the first RACH preamble transmission configuration (Block S108).

Figure 9:
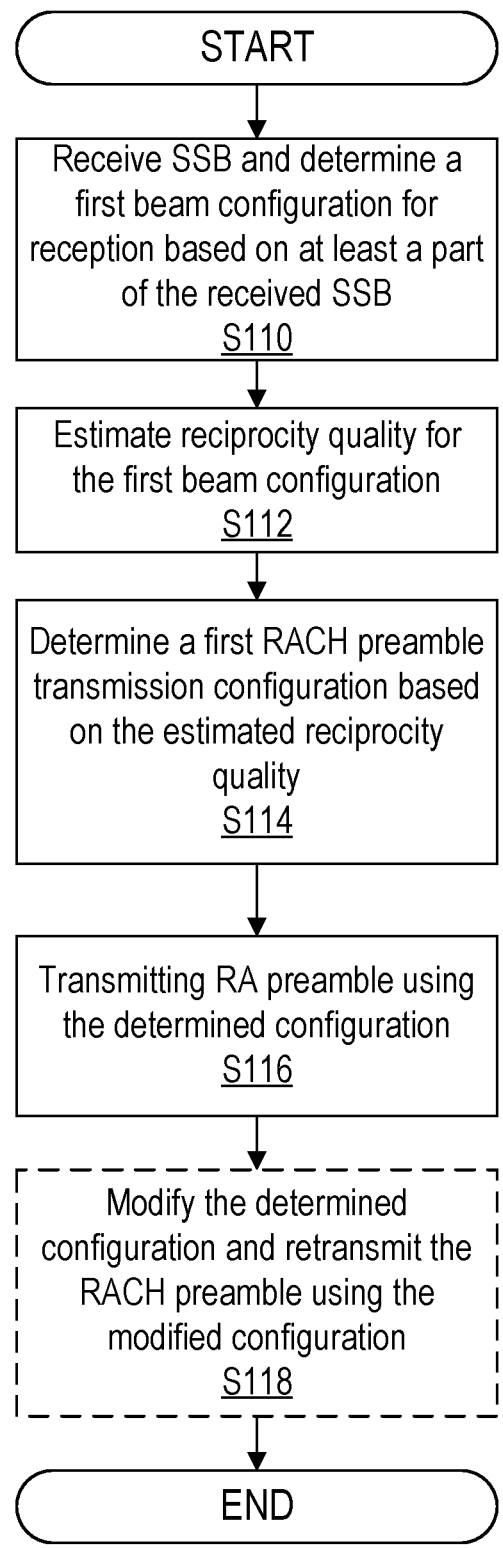
FIG. 9 is a flow diagram of another embodiment of the configuration process of configuration code in accordance with the principles of the disclosure.

FIG. 9 is a flow diagram of another embodiment of the configuration process of configuration code 36 in accordance with the principles of the disclosure. Processing circuitry 30 is configured to receive, via the receiver circuitry 28, an SSB and determine a preferred receive beam configuration based on at least a part of the received SSB. (Block S110). In Block S110, wireless device 14 receives SSB transmission from a cell or network node 12 in a network (NW). Wireless device 14 may attempt receiving the SSB using multiple receive (RX) beam configurations, e.g., FFT beams with predetermined width over a grid of directions. Wireless device 14 can determine the best RX beam configuration by, e.g., estimating the received power in the PSS and/or SSS signals when received according to multiple RX configurations and choosing the configuration that maximizes that power.

Processing circuitry 30 is configured to estimate DL/UL reciprocity quality (or simply "reciprocity quality") (Block S112). The estimation may comprise in fetching reciprocity quality values from a precomputed lookup table based on current operating parameters discussed above. Wireless device 14 estimates the quality or reliability of reciprocity information between its RX and TX beams. In one class of wireless device 14 implementations, the design of the transceiver hardware (HW) supports DL/UL reciprocity, but the degree to which DL/UL reciprocity (or simply "reciprocity" or "beam reciprocity" or "beam correspondence") is valid in a given situation depends on, e.g., wireless device 14 movement and rotation—if wireless device 14's spatial orientation changes between the RX and TX operations, the relevance of the preferred RX beam direction may be reduced. In one or more embodiments, DL/UL or UL/DL reciprocity signifies that certain beam parameters (e.g., direction, width, etc.) estimated or applied in the downlink are also predictably valid for beams transmitted in the uplink. With strict (coherent) reciprocity, the same precoding and combining weights produce the same TX and RX beam shapes respectively. Directional reciprocity (or beam correspondence) signifies that there exists a known mapping of beam configurations that lead to the same beam directions and widths in the UL and the DL. The movement or rotation rate may be estimated by wireless device 14, e.g., using channel estimation on the SSB symbols or on internal sensors of wireless device 14. The reliability of the best RX beam estimation may be quantified, e.g., by comparing the power estimates corresponding to the different candidate RX configurations. In another class of wireless device 14 implementations, it may be known beforehand that the transceiver hardware design, or the current deployment mode (e.g., frequency division duplex (FDD)), does not support or cannot handle reciprocity or beam correspondence, e.g., due to lack of reliable phase relationships between individual antenna elements or due to unpredictable phase or magnitude variations between TX and RX HW components.

Processing circuitry 30 is configured to determine a first RACH preamble transmission configuration (Block S114). Wireless device 14 determines the initial RACH preamble transmission configuration based on the reciprocity quality and the preferred SSB receive beam direction. For example, if a preferred SSB RX beam has been identified and the reciprocity quality is high or above a predefined threshold, wireless device 14 may start by transmitting a narrow beam in the preferred direction. If, on the other hand, the reciprocity quality is low or below a predefined threshold, wireless device 14 may start by using a cell-wide beam, or a relatively wide beam centered in the estimated preferred direction.

Processing circuitry 30 is configured to transmit the RA preamble using the determined configuration (Block S116). In some embodiments, processing circuitry 30 is configured to modify the determined beam configuration and retransmit the RACH preamble using the modified configuration (Block S118). For example, Block S118 handles situations where the initial preamble transmission did not succeed, e.g., no RAR was received by wireless device 14. In Block S118, wireless device 14 may modify the beam configuration from an initial wide configuration to a narrow configuration, or vice versa. (This does not imply that the initial or follow-up transmission must use a maximally wide or narrow configuration; intermediate configurations are equally applicable). Block S118 may also include multiple retransmissions, including changing beam width and/or direction parameters according to different possible patterns.

Block S118 may, for example, entail that wireless device 14 starts transmitting, in Block S116, using a broad beam, and if no RAR is received, wireless device 14 successively narrows the beam in the direction determined in Block S110, or multiple neighboring directions. When that TX direction does not result in a RAR, wireless device 14 may change the direction and again successively narrow the beam width. In another embodiment, Block S118 may entail that, upon not receiving a RAR after a wide beam transmission in Block S116, wireless device 14 performs a sweep of narrower, but not the narrowest, beams in the vicinity of the preferred direction, and successively narrows the beam widths if the current sweep does not succeed, i.e., when no RAR is detected. In a related embodiment, if the reciprocity information is not available or reliable, wireless device 14 may, in Block S118, perform a full sequential sweep at one or more narrower beam widths, without relying on any preferred direction. In one or more embodiments, Block S118 is optional such that this block may be skipped or omitted from the configuration process performed using configuration code 36.

In one aspect, Blocks S100-S108 capture the choice of initial RACH preamble beam configuration and transmission based on how reliable the reciprocity info is. In another aspect, Blocks S110-118 capture initial transmission with a first beam configuration and retransmission with modified configuration(s) if needed, irrespective of whether the reciprocity quality was considered. Both aspects may be implemented independent from each other in one or more embodiments.

Figure 10:
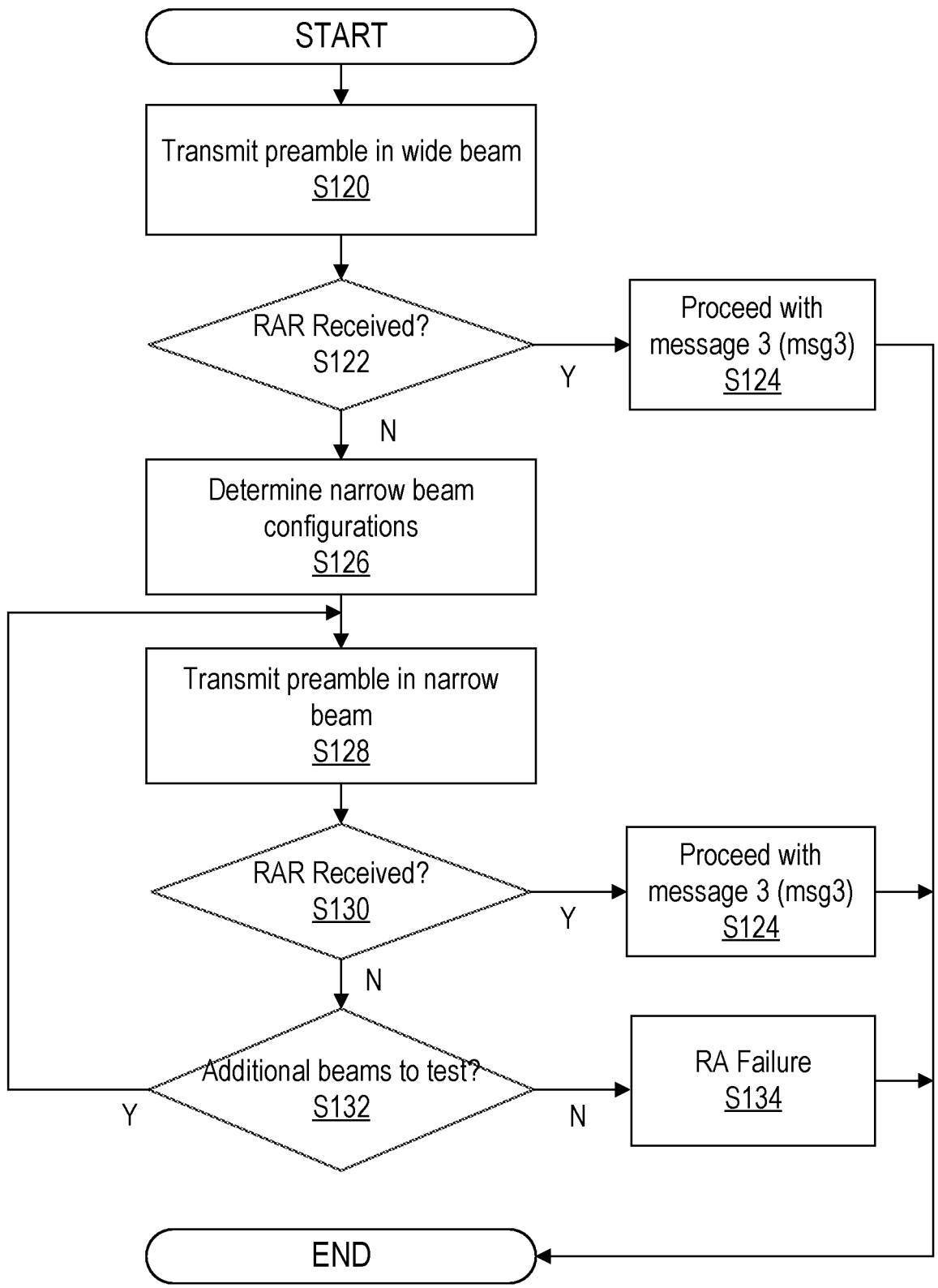
FIG. 10 is a flow diagram of an example, modification process of modification code in accordance with the principles of the disclosure.

FIG. 10 is a flow diagram of an example modification process performed using modification code 38 in accordance with the principles of the disclosure. FIG. 10 illustrates an example where, after the estimation of reciprocity quality, the DL/UL beam correspondence has been deemed low, e.g., in Block S112, of FIG. 9, and initially wide beam transmission has been selected, e.g., in Block S114 of FIG. 9. Blocks S120 and S126 of FIG. 10 are specific examples of S116 and S118 of FIG. 9, respectively. In other words, in one or more embodiments, the modification process of modification code 38 includes one or more blocks from the configuration process of configuration code 36.

Processing circuitry 30 is configured to transmit a preamble in wide beam, i.e., in a wide beam configuration (Block S120). For example, in Block S120, wireless device 14 transmits a RACH preamble (msg1) using a wide-beam (isotropic, omni-directional, cell-wide, etc.) The required wide beam may be formed by a single antenna element in the wireless device 14 antenna array 39. In this embodiment, the power amplifier (PA) of only one antenna element is radiated, while power from other PAs is not utilized. In one or more embodiments, the wide-beam transmission is affected using one of several maximal-power approaches that can utilize the power from all PAs in the wireless device array. Some examples of such approaches are the sub-array expansion and antenna-based subcarrier decomposition.

In Block S122, wireless device 14 awaits a RAR (msg2) from the network in response to the transmitted preamble. Msg2 confirms to wireless device 14 that the network or network node 12 received the preamble and provides a grant for wireless device 14 (e.g., the physical uplink control channel (PUCCH) configuration and timing advance). If the RAR is received, wireless device 14 continues with the rest of the RA procedure—transmitting msg3 (Block S124), receiving msg4, etc. Msg3 is the UL response from wireless device 14 transmitted upon receiving the RAR (msg2) using the grant from msg2 and containing more device status, capability and "reason to call" information. Msg4 is in turn the DL handshake from the network or network node 12. If the RAR is not received within a predetermined time limit, wireless device 14 determines that the wide-beam preamble transmission was not successful and proceeds to repeat preamble transmission using narrower, higher-gain beams. In some embodiments, the decision to proceed to narrow-beam transmission may be taken after multiple wide-beam preamble transmissions have failed, and/or the UL (from wireless device 14 to network node 12) power level has been ramped up by wireless device 14 in the successive transmissions.

In Block S126, wireless device 14 determines a set of one or more high-gain beam configurations for continued preamble transmission. In one embodiment, the candidate beam directions are based on SSB reception quality in the DL using different RX beam configurations. The candidate beam configurations may use FFT beam construction if wireless device 14 has a regular linear or planar antenna array. Wireless device 14 can estimate the relevance of each candidate beam direction by evaluating the SSB reception quality, e.g. reference signal received power (RSRP) or signal to interference and noise ratio (SINR), when receiving according to the different candidate beam configurations. Assuming an established DL/UL beam correspondence (directional reciprocity), the most relevant RX beam directions may be utilized for transmission of the preamble in the UL in Block S128, starting with the beam corresponding to the best SSB reception quality.

As another example of Block S126, in wireless devices with established coherent reciprocity between DL/UL antenna element HW, the preamble may be transmitted using precoding weights that match the DL channel coefficients for the individual antenna 39 elements. SSB components (PSS, SSS, PBCH, demodulation reference signal (DMRS), etc.) may be used for RX channel estimation and the obtained channel estimates used for determining TX precoding weights according to, e.g., matched filter precoding principles. The precoding weights are then applied in customized beam transmission in Block S128.

In Block S130, if the RAR message is received, wireless device 14 continues the RA procedure as planned. If not, wireless device 14 checks in Block S132 whether additional narrow transmission beam candidates remain and repeats the transmission procedure. In some embodiments, multiple attempts may be made on the same beamforming options and power ramping may be applied before moving to another TX beam configuration. Once all beam configurations are exhausted without receiving the RAR, the RA procedure may be classified as failed (Block S134) in which case wireless device 14 proceeds according to a predetermined protocol.

In one or more embodiments, the implementation of the disclosure complies with rules set for the RA procedure in the third generation partnership project (3GPP) specification. In one or more embodiments, the processes performed by wireless device 14, as described herein, are transparent to network node 12.

SOME EMBODIMENTS

Embodiment 1A relates to adaptation of the RACH preamble transmission based on the reciprocity quality.

Embodiment 2A adds the feature of retransmitting with a different configuration. However, in some systems and implementations, the reciprocity quality may not be evaluated in each situation but determined beforehand by the transceiver design.

Embodiment 1A. A method in a wireless device for transmission of a random access (RA) preamble, the method comprising:
a. receiving SSB and estimating a preferred receive beam direction;
b. estimating a DL/UL reciprocity (beam correspondence information) quality;
c. determining a RA preamble transmission configuration based on the reciprocity quality and the SSB receive beam direction; and
d. transmitting RA preamble using the determined configuration.

Embodiment 2A. The method of Embodiment 1A, further comprising modifying the determined configuration and transmitting the RACH preamble using a modified configuration.

Embodiment 3A. The method of Embodiment 2A, further comprising:
a. transmitting the preamble using a wide beam; and
b. in case of failure, re-transmitting the preamble using a narrow beam.

Embodiment 4A. The method of Embodiment 2A, further comprising
a. transmitting the preamble using a narrow beam; and
b. in case of failure, re-transmitting the preamble using a wide beam.

Embodiment 5A. The method of Embodiment 1A or 2A, wherein the wide beam is generated using subarray expansion technique.

Embodiment 6A. The method of Embodiment 1A or 2A, wherein the wide beam is generated using antenna-based subcarrier decomposition.

Embodiment 7A. The method of Embodiment 1A or 2A, wherein the narrow beam is generated using FFT beam construction.

Embodiment 8A. The method of Embodiment 7A, wherein the UL beam is based on DL reception quality using a corresponding DL beam.

Embodiment 9A. The method of Embodiment 1A or 2A, wherein the narrow beam is generated using matched filter (MF) precoding.

Embodiment 10A. The method of Embodiment 9A, wherein the MF precoding weights are based on SSB channel estimation Some additional embodiments are as follows:

Embodiment 1. A wireless device, comprising:
processing circuitry including a processor and a memory, the processing circuitry configured to:
receive a synchronization signal block, SSB;
determine a first beam configuration for reception based on the received SSB;
estimate a reciprocity quality for the first beam configuration in a downlink and an uplink;
determine a first random access channel, RACH, preamble transmission configuration based on the estimated reciprocity quality; and
transmit a first random access, RA, preamble using the first RACH preamble transmission configuration.

Embodiment 2. The wireless device of Embodiment 1, wherein the SSB includes a primary synchronization signal (PSS), a secondary synchronization signal (SSS) and a broadcast channel (PBCH).

Embodiment 3. The wireless device of any one of Embodiments 1-2, wherein if the reciprocity quality is above a predefined threshold, the first RACH preamble transmission configuration is a narrow beam configuration.

Embodiment 4. The wireless device of any one of Embodiments 1-3, wherein if the reciprocity quality is below a predefined threshold, the first RACH preamble transmission configuration is a wide beam configuration.

Embodiment 5. The wireless device of any one of Embodiments 1-4, wherein reciprocity quality is based on at least one taken from a group consisting of wireless device movement and wireless device rotation.

Embodiment 6. The wireless device of any one of Embodiments 1-5, wherein the processing circuitry is further configured to:
if RA response (RAR) is not received:
modify the first RACH preamble transmission configuration to a second RACH preamble transmission configuration different from the first RACH preamble transmission configuration; and
transmit second RA preamble using the second RACH preamble transmission configuration.

Embodiment 7. A method for a wireless device, the method comprising:
receiving a synchronization signal block, SSB;
determining a first beam configuration for reception based on the received SSB;
estimating a reciprocity quality for the first beam configuration in a downlink and an uplink;
determining a first random access channel, RACH, preamble transmission configuration based on the estimated reciprocity quality; and
transmitting a first random access, RA, preamble using the first RACH preamble transmission configuration.

Embodiment 8. The method of any one of Embodiment 7, wherein the SSB includes a primary synchronization signal (PSS), a secondary synchronization signal (SSS) and a broadcast channel (PBCH).

Embodiment 9. The method of any one of Embodiments 7-8, wherein if the reciprocity quality is above a predefined threshold, the first RACH preamble transmission configuration is a narrow beam configuration.

Embodiment 10. The method of any one of Embodiments 7-10, wherein if the reciprocity quality if below a predefined threshold, the first RACH preamble transmission configuration is a wide beam configuration.

Embodiment 11. The method of any one of Embodiments 7-10, wherein reciprocity quality is based on at least one taken from a group consisting of wireless device movement and wireless device rotation.

Embodiment 12. The method of any one of Embodiments 7-11, wherein if RA response (RAR) is not received, the method further comprising:
modifying the first RACH preamble transmission configuration to a second RACH preamble transmission configuration different from the first RACH preamble transmission configuration; and
transmitting second RA preamble using the second RACH preamble transmission configuration.

Embodiment 13. A wireless device, comprising:
a reception module configured to receive a synchronization signal block, SSB;
a configuration determination module configured to determine a beam configuration for reception based on the received SSB;

an estimation module configured to estimate a reciprocity quality for the beam configuration in a downlink and an uplink;

a random access channel, RACH, determination module configured to determine a RACH preamble transmission configuration based on the estimated reciprocity quality; and a transmission module configured to transmit a random access, RA, preamble using the determined RACH preamble transmission configuration.

Thus, according to one aspect, in some embodiments, a wireless device 14 includes processing circuitry 30 including a processor and a memory 34. The processing circuitry 30 is configured to: receive a synchronization signal block (SSB) and determine a first beam configuration for reception based on at least a part of the received SSB. The processing circuitry 30 is further configured to estimate a reciprocity quality for the first beam configuration in a downlink and an uplink. The processing circuitry 30 is further configured to determine a first random access channel (RACH) preamble transmission configuration based on the estimated reciprocity quality, and transmit a first random access (RA) preamble using the first RACH preamble transmission configuration.

According to this aspect, in some embodiments, the SSB includes a primary synchronization signal (PSS), a secondary synchronization signal (SSS) and a broadcast channel (PBCH). In some embodiments, the reciprocity quality is a measure of an extent to which at least one beam parameter estimated in a receiver of the wireless device 14 deviates from a corresponding beam parameter of a corresponding beam transmitted by a network node 12 to the wireless device 14, wherein the greater the deviation, the lower the reciprocity quality. In some embodiments, a beam parameter of the at least one beam parameter is one of a beam direction and a beam width and a measure of deviation is a difference in one of a direction and a width between a beam of the first beam configuration and the corresponding beam transmitted by the network node 12. In some embodiments, when the reciprocity quality is above a predefined threshold, the first RACH preamble transmission configuration is a narrow beam configuration. In some embodiments, when the reciprocity quality is below a predefined threshold, the first RACH preamble transmission configuration is a wide beam configuration.

In some embodiments, the reciprocity quality depends at least in part on at least one of wireless device 14 movement and wireless device 14 rotation. In some embodiments, the processing circuitry 30 is further configured to: responsive to an RA response (RAR) being not received: modify the first RACH preamble transmission configuration to a second RACH preamble transmission configuration different from the first RACH preamble transmission configuration; and transmit second RA preamble using the second RACH preamble transmission configuration. In some embodiments, in case of a communication failure using the first beam, the first RA preamble is retransmitted using a second beam. In some embodiments, the first beam is a narrow beam and the second beam is a wide beam. In some embodiments, the processing circuitry is configured to generate a wide beam using a subarray expansion technique. In some embodiments, the processing circuitry is configured to generate a wide beam using antenna-based subcarrier decomposition. In some embodiments, the processing circuitry is configured to generate a narrow beam using fast Fourier transform (FFT) beam construction. In some embodiments, the processing circuitry is configured to generate a narrow beam using matched filter precoding.

According to another aspect, in some embodiments, a method for a wireless device 14 includes receiving a synchronization signal block (SSB) (block S100) and determining a first beam configuration for reception based on at least a part of the received SSB (block S102). The method further includes estimating a reciprocity quality for the first beam configuration in a downlink and an uplink (block S104). The method further includes determining a first RACH preamble transmission configuration based on the estimated reciprocity quality (block S106), and transmitting a first RA preamble using the first RACH preamble transmission configuration (block S108).

According to this aspect, in some embodiments, the SSB includes a PSS, a SSS and a PBCH. In some embodiments, the reciprocity quality is a measure of an extent to which at least one beam parameter estimated in a receiver of the wireless device 14 deviates from a corresponding beam parameter of a corresponding beam transmitted by a network node 12 to the wireless device 14, wherein the greater the deviation, the lower the reciprocity quality. In some embodiments, a beam parameter of the at least one beam parameter is one of a beam direction and a beam width and a measure of deviation is a difference in one of a direction and a width between a beam of the first beam configuration and the corresponding beam transmitted by the network node 12. In some embodiments, when the reciprocity quality is above a predefined threshold, the first RACH preamble transmission configuration is a narrow beam configuration. In some embodiments, when the reciprocity quality if below a predefined threshold, the first RACH preamble transmission configuration is a wide beam configuration. In some embodiments, reciprocity quality depends at least in part on at least one of wireless device 14 movement and wireless device 14 rotation. In some embodiments, the method further includes: responsive to an RAR not being received: modifying the first RACH preamble transmission configuration to a second RACH preamble transmission configuration different from the first RACH preamble transmission configuration, and transmitting the second RA preamble using the second RACH preamble transmission configuration. In some embodiments, in case of a communication failure using the first beam, the method further includes retransmitting the first RA preamble using a second beam. In some embodiments, the first beam is a narrow beam and the second beam is a wide beam. In some embodiments, the method further includes generating a wide beam using a subarray expansion technique. In some embodiments, the method further includes generating a wide beam using antenna-based subcarrier decomposition. In some embodiments, the method further includes generating a narrow beam using FFT beam construction. In some embodiments, the method further includes generating a narrow beam using matched filter precoding.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A wireless device, comprising:
processing circuitry including a processor and a memory, the processing circuitry configured to:
receive a synchronization signal block, SSB;
determine a first beam configuration for reception based on at least a part of the received SSB;
estimate a reciprocity quality for the first beam configuration in a downlink and an uplink;
determine a first random access channel, RACH, preamble transmission configuration based on the estimated reciprocity quality;
transmit a first random access, RA, preamble using the first RACH preamble transmission configuration; and
responsive to an RA response, RAR, not being received:
modify the first RACH preamble transmission configuration to a second RACH preamble transmission configuration different from the first RACH preamble transmission configuration; and
transmit second RA preamble using the second RACH preamble transmission configuration.

2. The wireless device of claim 1, wherein the SSB includes a primary synchronization signal, PSS, a secondary synchronization signal, SSS, and a broadcast channel, PBCH.

3. The wireless device claim 1, wherein the reciprocity quality is a measure of an extent to which at least one beam parameter estimated in a receiver of the wireless device deviates from a corresponding beam parameter of a corresponding beam transmitted by a network node to the wireless device, wherein the greater the deviation, the lower the reciprocity quality.

4. The wireless device of claim 3, wherein a beam parameter of the at least one beam parameter is one of a beam direction and a beam width and a measure of deviation is a difference in one of a direction and width between a beam of the first beam configuration and a corresponding beam transmitted by the network node.

5. The wireless device claim 1, wherein when the reciprocity quality is above a predefined threshold, the first RACH preamble transmission configuration is a narrow beam configuration.

6. The wireless device claim 1, wherein when the reciprocity quality is below a predefined threshold, the first RACH preamble transmission configuration is a wide beam configuration.

7. The wireless device claim 1, wherein the reciprocity quality depends at least in part on at least one of wireless device movement and wireless device rotation.

8. The wireless device claim 1, wherein, in case of a communication failure using the first beam, being configured to retransmit the first RA preamble using a second beam.

9. The wireless device of claim 8, wherein the first beam is a narrow beam and the second beam is a wide beam.

10. The wireless device of claim 9, wherein the processing circuitry is configured to generate the wide beam using a subarray expansion technique.

11. The wireless device of claim 9, wherein the processing circuitry is configured to generate the wide beam using antenna-based subcarrier decomposition.

12. The wireless device claim 9, wherein the processing circuitry is configured to generate the narrow beam using fast Fourier transform, FFT, beam construction.

13. The wireless device claim 9, wherein the processing circuitry is configured to generate the narrow beam using matched filter precoding.

14. A method for a wireless device, the method comprising:
receiving a synchronization signal block, SSB;
determining a first beam configuration for reception based on at least a part of the received SSB;
estimating a reciprocity quality for the first beam configuration in a downlink and an uplink;
determining a first random access channel, RACH, preamble transmission configuration based on the estimated reciprocity quality; and
transmitting a first random access, RA, preamble using the first RACH preamble transmission configuration; and
responsive to an RA response, RAR, not being received:
modifying the first RACH preamble transmission configuration to a second RACH preamble transmission configuration different from the first RACH preamble transmission configuration; and
transmitting the second RA preamble using the second RACH preamble transmission configuration.

15. The method of claim 14, wherein the SSB includes a primary synchronization signal, PSS, a secondary synchronization signal, SSS, and a broadcast channel, PBCH.

16. The method of claim 14, wherein the reciprocity quality is a measure of an extent to which at least one beam parameter estimated in a receiver of the wireless device deviates from a corresponding beam parameter of a corresponding beam transmitted by a network node to the wireless device, wherein the greater the deviation, the lower the reciprocity quality.

17. The method of claim 16, wherein a beam parameter of the at least one beam parameter is one of a beam direction and beam width and a measure of deviation is a difference in one of a direction width between a beam of the first beam configuration and a corresponding beam transmitted by the network node.

18. The method of claim 14, wherein when the reciprocity quality is above a predefined threshold, the first RACH preamble transmission configuration is a narrow beam configuration.

19. The method of claim 14, wherein when the reciprocity quality is below a predefined threshold, the first RACH preamble transmission configuration is a wide beam configuration.

20. The method of claim 14, wherein reciprocity quality depends at least in part on at least one of wireless device movement and wireless device rotation.

21. The method of claim 14, wherein, in case of a communication failure using the first beam, further comprising retransmitting the first RA preamble using a second beam.

22. The method of claim 21, wherein the first beam is a narrow beam and the second beam is a wide beam.

23. The method of claim 22, further comprising generating the wide beam using a subarray expansion technique.

24. The method of claim 22, further comprising generating the wide beam using antenna-based subcarrier decomposition.

25. The method of claim 22, further comprising generating the narrow beam using fast Fourier transform, FFT, beam construction.

26. The method of claim 22, further comprising generating the narrow beam using matched filter precoding.

* * * * *